(12) United States Patent
Botros (10) Patent No.: US 10,240,072 B2
(45) Date of Patent: *Mar. 26, 2019

(54) COMPOSITIONS WITH A GRAFTED POLYOLEFIN COPOLYMER HAVING CONSTITUENTS OF AN UNSATURATED MONOMER, AN OLEFIN ELASTOMER, AND A LONG-CHAIN BRANCHED POLYOLEFIN

(71) Applicant: Equistar Chemicals, LP, Houston, TX (US)

(72) Inventor: Maged G. Botros, Liberty Township, OH (US)

(73) Assignee: Equistar Chemicals, LP, Houston, TX (US)

( * ) Notice: Subject to any disclaimer, the term of this patent is extended or adjusted under 35 U.S.C. 154(b) by 633 days.

This patent is subject to a terminal disclaimer.

(21) Appl. No.: 14/056,337

(22) Filed: Oct. 17, 2013

(65) Prior Publication Data

US 2015/0111034 A1 Apr. 23, 2015

(51) Int. Cl.
*C09J 151/06* (2006.01)
*C08L 51/06* (2006.01)
(Continued)

(52) U.S. Cl.
CPC ......... *C09J 123/0815* (2013.01); *B32B 27/32* (2013.01); *C08F 255/02* (2013.01); *C08L 23/06* (2013.01); *C08L 23/0815* (2013.01); *C08L 23/16* (2013.01); *C08L 51/06* (2013.01); *C09J 151/06* (2013.01); *C08L 2203/16* (2013.01);
(Continued)

(58) Field of Classification Search
CPC .... C08F 291/00; C08F 291/02; C08F 255/00; C08F 255/02; B32B 27/32; B32B 7/12; B32B 37/04; C09J 123/06; C09J 123/0815; C09J 123/16; C08L 23/06; C08L 23/0815; C08L 51/04; C08L 51/06
See application file for complete search history.

(56) References Cited

U.S. PATENT DOCUMENTS 4,460,745 A 7/1984 Adur et al.
5,296,552 A * 3/1994 Ohmae ................ C08F 255/00
525/193

(Continued)

FOREIGN PATENT DOCUMENTS

WO WO-2008018949 A1 2/2008
WO WO 2009035885 A1 * 3/2009 ............... B32B 1/08

OTHER PUBLICATIONS

PCT International Search Report and Written Opinion dated Jan. 19, 2015 (dated Jan. 19, 2015) for Corresponding PCT PCT/US2014/060720.

*Primary Examiner* — Monique R Jackson (57) ABSTRACT

The present disclosure provides a polyolefin-based composition, suitable for use as a tie-layer adhesive composition, and a process for making the polyolefin-based composition. The polyolefin-based composition is made from and/or contains a grafted polyolefin copolymer composition, a base resin composition, and optionally, an additives composition. The grafted polyolefin copolymer composition is made from and/or contains a grafted polyolefin composition, an olefin elastomer composition, and a long-chain branched polyolefin composition. The grafted polyolefin is coupled to the olefin elastomer and the long-chain branched polyolefin.

6 Claims, 2 Drawing Sheets

(51) Int. Cl.

| | |
|---|---|
| *C08F 255/02* | (2006.01) |
| *C09J 123/08* | (2006.01) |
| *C08L 23/08* | (2006.01) |
| *B32B 27/32* | (2006.01) |
| *C08L 23/06* | (2006.01) |
| *C08L 23/16* | (2006.01) |

(52) U.S. Cl.
CPC ... *C08L 2205/035* (2013.01); *C08L 2207/062* (2013.01); *C08L 2207/07* (2013.01); *Y10T 428/2878* (2015.01)

(56) References Cited

U.S. PATENT DOCUMENTS

| | | | |
|---|---|---|---|
| 5,744,250 A * | 4/1998 | Lee | B32B 27/08 |
| | | | 428/515 |
| 6,475,633 B1 * | 11/2002 | Robert | B32B 7/12 |
| | | | 428/476.9 |
| 7,687,575 B2 | 3/2010 | Lee et al. | |
| 8,637,159 B2 | 1/2014 | Botros | |
| 8,685,539 B2 | 4/2014 | Botros | |
| 2008/0032148 A1 | 2/2008 | Lee et al. | |
| 2010/0174036 A1 | 7/2010 | Lee et al. | |
| 2011/0077356 A1 * | 3/2011 | Besser | C08F 2/36 |
| | | | 525/78 |
| 2012/0077048 A1 | 3/2012 | Botros | |
| 2013/0052471 A1 | 2/2013 | Botros | |
| 2013/0260064 A1 | 10/2013 | Botros | |

* cited by examiner

FIG. 1

FIG. 2

COMPOSITIONS WITH A GRAFTED POLYOLEFIN COPOLYMER HAVING CONSTITUENTS OF AN UNSATURATED MONOMER, AN OLEFIN ELASTOMER, AND A LONG-CHAIN BRANCHED POLYOLEFIN

FIELD OF THE INVENTION

The present disclosure relates to polyolefin-based compositions useful as adhesives and/or tie-layer adhesive compositions for multi-layer structures. In particular, the polyolefin-based composition is made from and/or contains a grafted polyolefin-based composition compounded with a base resin composition.

DESCRIPTION OF RELATED ART

Tie-layer adhesives are used to bond polyolefins to dissimilar substrates in multi-layer, co-extruded structures, particularly for blown and cast film, extrusion coating, blow molding, sheet extrusion, wire and cable, pipe, and other industrial applications. In particular, the adhesives are useful for bonding plastic, wood, glass, paper, composite, and metal substrates. They can be used in lamination, extrusion (or coextrusion), sheet extrusion, extrusion coating, injection molding, blow molding, melt thermoforming, and other processes.

The tie-layer adhesive typically is made from and/or contains a polyolefin base resin, which is the predominant component, and a grafted polyolefin. The grafted polyolefin is produced by reacting a polyolefin with an unsaturated monomer at elevated temperatures with or without a free-radical initiator. Commercially available tie-layer adhesives include Plexar™ resins, products of Equistar Chemicals, LP, which are anhydride-modified polyolefins.

In addition to the base resin and the grafted polyolefin, tie-layer adhesives commonly include other polymer resins or additives to provide better adhesion, clarity, or other benefits. Usually, there are tradeoffs. For instance, modifications that improve adhesion often reduce clarity, and vice versa.

Elastomers—random or block copolymers—are commonly included in tie-layer adhesive compositions to improve compatibility, increase adhesion, or impart other benefits. Styrene-based block copolymers, for instance, have been used to improve adhesion in multi-layer constructions that require bonding of polyethylene to a styrenic polymer (U.S. Patent Application Publication No. 2007/0071988 and U.S. Patent Application Publication No. 2007/0167569).

Other commonly used elastomers include olefin elastomers, such as ethylene-propylene rubber (EPR) and ethylene-propylene-diene monomer rubber (EPDM).

Many references teach blending an olefin elastomer with other tie-layer adhesive components (see, e.g., U.S. Patent Application Publication No. 2005/0163996, U.S. Pat. No. 6,835,777, U.S. Pat. No. 7,687,575, U.S. Patent Application Publication No. 2009/0035594, and U.S. Patent Application Publication No. 2010/0174036).

Clarity of multi-layer films is often an issue, particularly for the food packaging industry. Wraps for meat and cheese, snack foods, baking mixes, and other food products require barrier layers (e.g., ethylene-vinyl alcohol (EVOH), polyamides, and polyolefins) to prevent transmission of oxygen and/or moisture, and making such structures with high clarity poses a formidable challenge. Additives, such as the bicyclic modifiers of U.S. Patent Application Publication No. 2007/0054142, are sometimes employed to improve clarity without sacrificing adhesion.

U.S. Patent Application Publication No. 2010/0174036 teaches that tie-layer adhesives useful for multi-layer films having a favorable balance of clarity and adhesion can be made by blending, in sequence, a grafted ("maleated") polyolefin, a polyolefin elastomer, and LLDPE.

U.S. Patent Application Publication No. 2012/0077048 discloses a graft composition useful for tie-layer adhesives and multi-layer structures having improved adhesion and clarity, where the graft composition contains an LLDPE and the reaction product of a live, grafted polyolefin and an olefin elastomer. U.S. Patent Application Publication No. 2013/0052470 discloses an oriented multilayer structure, having a tie-layer made from and/or containing the reaction product of a live, grafted polyolefin and an olefin elastomer.

U.S. Patent Application Publication No. 2013/0052471 discloses a graft composition useful for tie-layer adhesives and multi-layer structures having improved adhesion and clarity, where the graft composition contains an LLDPE, an LDPE, and the reaction product of a live, grafted polyolefin and an olefin elastomer.

Improved tie-layer adhesive compositions suitable for use in making multi-layer structures with good adhesion and high clarity are needed. A valuable approach would avoid expensive additives and performance tradeoffs. Ideally, improved tie-layer adhesives could be made using economical starting materials, commonly used equipment, and familiar techniques.

SUMMARY OF THE INVENTION

In some embodiments, the present disclosure is directed to a polyolefin-based composition, suitable for use as a tie-layer adhesive composition, or a process for making the polyolefin-based composition made from and/or containing (a) from about 2 to about 50 weight percent of a grafted polyolefin copolymer composition, relative to the total weight of the polyolefin-based composition, (b) from about 50 to about 98 weight percent of a base resin composition, relative to the total weight of the polyolefin-based composition, and (c) optionally, an additives composition made from and/or containing one or more additives.

The grafted polyolefin copolymer composition is made from and/or contains (i) a grafted polyolefin composition, (ii) an olefin elastomer composition, and (iii) a long-chain branched polyolefin composition. The grafted polyolefin is coupled to the olefin elastomer to form a first couplet, and the olefin elastomer is present an amount from about 0.2 to about 60 weight percent of the grafted polyolefin copolymer. The first couplet of the grafted polyolefin and the olefin elastomer is coupled to the long-chain branched polyolefin to form a second couplet of grafted polyolefin, olefin elastomer, and long-chain branched polyolefin. The long-chain branched polyolefin is present in an amount from about 1.5 to about 50 weight percent of the grafted polyolefin copolymer.

The use of the terms "first" and "second" in the preceding paragraph are not intended to indicate sequence but rather difference. As such, the grafted polyolefin could be coupled to the long-chain branched polyolefin to form the first couplet. Alternatively, the couplet components may combine simultaneously to from a single couplet of grafted polyolefin, olefin elastomer, and long-chain branched polyolefin. Moreover, the couplets can be formed in any order or simultaneously.

In further embodiments, the grafted polyolefin copolymer composition is made from and/or contains a high-density polyethylene (HDPE) grafted with (a) maleic anhydride, (b) an olefin elastomer composition made from and/or containing ethylene propylene rubbers (EPR) and/or ethylene-propylene-diene monomer rubbers (EPDM), and (c) a long-chain branched polyolefin composition made from and/or containing a low density polyethylene (LDPE).

In additional embodiments, the base resin composition is made from and/or contains a linear low density polyethylene (LLDPE).

The additives composition can be made from and/or contain antioxidants, stabilizers, and combinations thereof.

In further embodiments, the composition can be used as a tie layer for a multi-layer structure.

DESCRIPTION OF THE DRAWINGS

Further details will be apparent from the following detailed description, with reference to the enclosed drawing, in which.

DETAILED DESCRIPTION

Figure 1:
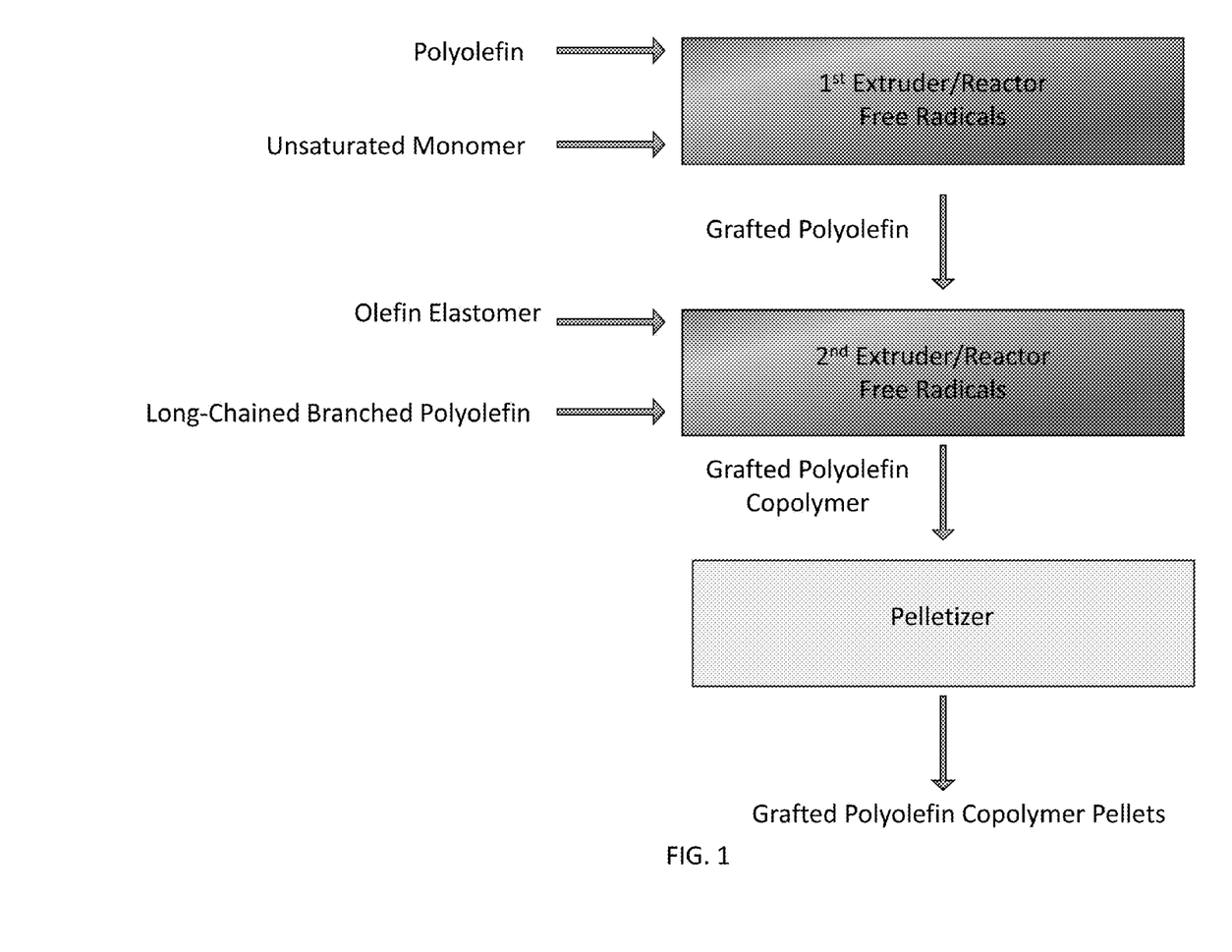
FIG. 1 and FIG. 2 are block diagrams showing a general embodiment of a process for making a polyolefin-based composition within the present disclosure.
Figure 2:
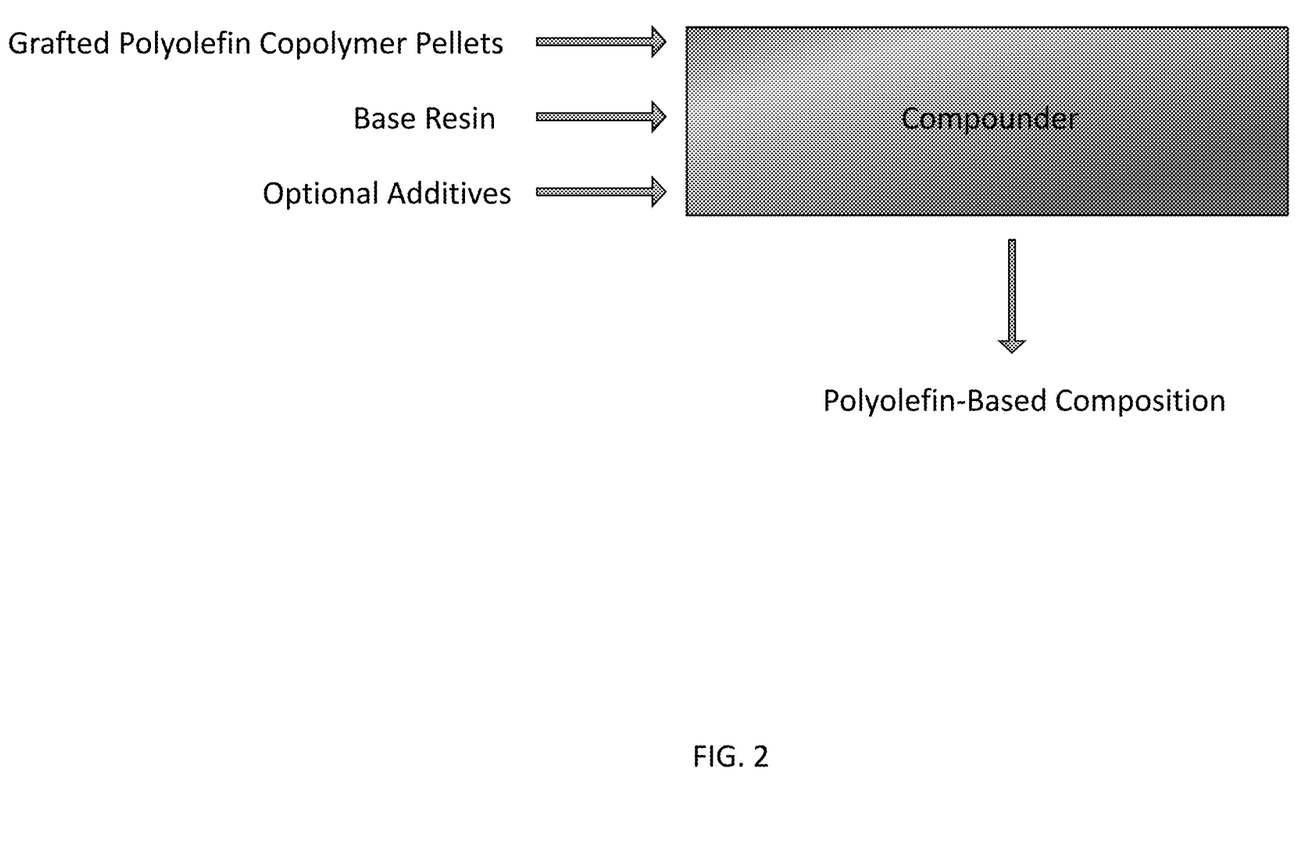

The present invention now will be described more fully hereinafter. However, this invention may be embodied in many different forms and should not be construed as limited to the embodiments set forth herein; rather, these embodiments are provided so that this disclosure will satisfy applicable legal requirements. As such, it will be apparent to those skilled in the art that the embodiments may incorporate changes and modifications without departing from the general scope of this invention. It is intended to include all such modifications and alterations in so far as they come within the scope of the appended claims or the equivalents thereof.

As used in this specification and the claims, the singular forms "a," "an," and "the" include plural referents unless the context clearly dictates otherwise.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Definitions

In the present description, the term "α-olefin" means an olefin of formula $CH_2=CH-R$, wherein R is a linear or branched alkyl containing from 1 to 10 carbon atoms. The α-olefin can be selected, for example, from: propylene, 1-butene, 1-pentene, 1-hexene, 1-octene, 1-dodecene and the like.

In the present description, the phrase "coupling, in the presence of free radicals" or the phrase "in the presence of free radicals, coupling" refers to the combining at least two polymeric components of a polymer composition, in the presence of free-radicals, at a mixing temperature greater than the melting point of the major polymeric component, wherein the polymeric components may be covalently-bonded to each other, physically-entangled with each other, evenly-distributed amongst each other in the polymer composition, and/or structurally-aligned with each other. The coupling may involve secondary and/or tertiary structures of the polymeric components. Preferably, the mixing temperature is greater than than the melting point of all components.

At least one physical property of the polymer composition is measurably distinct from the same property of a physical blend of the polymeric components prepared with the same amount of the polymeric components in the absence of free radicals.

In the present description, the term "elastomer" refers to polymer compounds having rubber-like properties and crystallinity less than about 10 percent, more preferably less than about 5 percent, and most preferably no crystallinity.

In the present description, the term "grafted polyolefin" refers to a polyolefin grafted with an unsaturated monomer. The unsaturated monomer is typically an unsaturated polar monomer, preferably containing one or more oxygen atoms. Preferred examples of such unsaturated monomers will be given hereinafter.

In the present description, the term "grafted polyolefin composition" refers to a composition made from and/or containing at least one grafted polyolefin.

In the present description, the term "grafted polyolefin copolymer" refers to a polyolefin grafted with an unsaturated monomer, coupled with an olefin elastomer, and coupled with a long-chained branched polyolefin. The coupling occurs in the presence of free radicals.

In the present description, the term "grafted polyolefin copolymer composition" refers to a composition made from and/or containing at least one grafted polyolefin copolymer.

In the present description, the term "live, grafted polyolefin" refers to a grafted polyolefin that can react with residual polyolefins, residual unsaturated monomers, residual free-radical initiators, newly-added olefin elastomers, newly-added polyolefins, newly-added unsaturated monomers, or newly-added free-radical initiators.

A live, grafted polyolefin contains active free-radical species generated thermally by vis-breaking or from peroxide decomposition. The residual radical content allows free-radical reactions to continue between the grafted polyolefin and any of residual polyolefins, residual unsaturated monomers, residual free-radical initiators, newly-added olefin elastomers, newly-added polyolefins, newly-added unsaturated monomers, or newly-added free-radical initiators. One or more of the components may be involved in (a) secondary reactions or (b) coupling, in the presence of free radicals.

Commercially available grafted polyolefins are not "live" because the reactivity of the free-radical content was depleted or the free-radical content was quenched during workup of the product.

In the present description, the term "long-chain" refers to carbon chains that are C6 or longer. "Long chain branching (LCB)" can be determined by conventional techniques known in the industry, such as $^{13}C$ nuclear magnetic resonance ($^{13}C$ NMR) spectroscopy, using, for example, the method of Randall (Rev. Micromole. Chem. Phys., C29 (2&3) 1989, p. 285-297). Two other methods are gel permeation chromatography, coupled with a low angle laser light scattering detector (GPC-LALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301(1949) and Rudin, A., Modern Methods of Polymer Characterization, John Wiley & Sons, New York (1991) pp. 103-112.

In the present description, the term "long-chain branched polyolefin" refers to a polyolefin having at least 1 long chain branch per 1000 carbons.

In the present description, the term "long-chain branched polyolefin composition" refers to a composition made from and/or containing at least one long-chain branched polyolefin.

In the present description, the term "olefin elastomer composition" refers to a composition made from and/or containing at least one olefin elastomer.

Testing

ASTM D 1238 Test Method for Melt Flow Rates of Thermoplastics by Extrusion Plastometer: The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

Throughout the present description and claims, all the standard melt index values are measured according to ASTM D 1238, using a piston load of 2.16 kg and at a temperature of 190 degrees Celsius. The High Load Melt Index (or HLMI) values are also measured according to ASTM D 1238, but using a piston load of 21.6 kg and at a temperature of 190 degrees Celsius.

ASTM D 1505 Standard Test Method for Density of Plastics by the Density-Gradient Technique: The term "ASTM D 1505" as used herein refers to the standard test method for determining density of plastics by the density-gradient technique. In general, this test method is based on observing the level to which a test specimen sinks in a liquid column exhibiting a density gradient, in comparison with standards of known density. This test method was approved on Jul. 1, 2010 and published September 2010, the contents of which are incorporated herein by reference in its entirety. For the referenced ASTM standards, visit the ASTM website, www.astm.org, or contact ASTM Customer Service at service@astm.org. Throughout the present description and claims, all the density values are measured according to ASTM D 1505.

ASTM D 1876 Standard Test Method for Peel Resistance of Adhesives (T-Peel Test): The term "ASTM D 1876" as used herein refers to a test method for determining the relative peel resistance of adhesive bonds between flexible adherends by means of a T-type specimen. The accuracy of the results of strength tests of adhesive bonds will depend on the conditions under which the bonding process is carried out. This test method was approved on Oct. 10, 2001 and published December 2001, the contents of which are incorporated herein by reference in its entirety. For the referenced ASTM standards, visit the ASTM website, www.astm.org, or contact ASTM Customer Service at service@astm.org.

The force required to separate the film apart in a T-peel configuration at 25.4 cm (10 inches)/min is measured using an INSTRON™ tensile tester. The average adhesion of five specimens is recorded as the peel strength in kg/cm (lb/in).

Percent Clarity using Narrow Angle Scattering (NAS): NAS refers to the "see-through" clarity. NAS measurements are performed using a ZEBEDEE™ CL-100 clarity meter.

The samples are cut into 10×10 cm squares and adhered to the test unit in the front of the light source by air suction. The average clarity of seven specimens is recorded as the average clarity.

Higher NAS values indicate better "see-through" clarity. It is believed that interfacial disturbances reduce NAS values because of adhesion of a tie-layer to a barrier substrate.

Incorporated Unsaturated Monomer (Weight Percent): The amount of the unsaturated monomer incorporated into the grafted polyolefin can be measured by wet chemical methods (titration, etc.) or more preferably, by Fourier transform infrared spectroscopy (FTIR), according to methods that are well known in the art.

In a general embodiment, the present disclosure provides a polyolefin-based composition, suitable for use as a tie-layer adhesive composition, or a process for making the polyolefin-based composition made from and/or containing (a) from about 2 to about 50 weight percent of a grafted polyolefin copolymer composition, relative to the total weight of the polyolefin-based composition, (b) from about 50 to about 98 weight percent of a base resin composition, relative to the total weight of the polyolefin-based composition, and (c) optionally, an additives composition made from and/or containing one or more additives.

Preferably, the grafted polyolefin copolymer composition is present in an amount from about 15 to about 35 weight percent, relative to the total weight of the polyolefin-based composition. More preferably, the grafted polyolefin copolymer composition is present in an amount from about 20 to about 30 weight percent.

The grafted polyolefin copolymer composition is made from and/or contains (i) a grafted polyolefin composition, (ii) an olefin elastomer composition, and (iii) a long-chain branched polyolefin composition. The grafted polyolefin is coupled to the olefin elastomer to form a first couplet, and the olefin elastomer is present an amount from about 0.2 to about 60 weight percent of the grafted polyolefin copolymer. The first couplet of the grafted polyolefin and the olefin elastomer is coupled to the long-chain branched polyolefin to form a second couplet of grafted polyolefin, olefin elastomer, and long-chain branched polyolefin. The long-chain branched polyolefin is present in an amount from about 1.5 to about 50 weight percent of the grafted polyolefin copolymer.

The use of the terms "first" and "second" in the preceding paragraph are not intended to indicate sequence but rather difference. As such, the grafted polyolefin could be coupled to the long-chain branched polyolefin to form the first couplet. Alternatively, the couplet components may combine simultaneously to from a single couplet of grafted polyolefin, olefin elastomer, and long-chain branched polyolefin. Moreover, the couplets can be formed in any order or simultaneously.

Grafted polyolefins suitable for use in making the grafted polyolefin composition are prepared by reacting polyolefins with unsaturated monomers at elevated temperatures, with or without a free-radical initiator, under conditions effective to graft unsaturated monomer units onto the polyolefin backbone. Preferably, the grafting reaction occurs under an inert gas, such as nitrogen.

Polyolefins suitable for making the grafted polyolefins include high density polyethylenes (HDPE), medium density polyethylenes (MDPE), low density polyethylenes (LDPE), linear low density polyethylenes (LLDPE), polypropylenes, ethylene-propylene copolymers, impact-modified poly-propylenes, and the like, and blends thereof. Preferred polyolefins for making the grafted polyolefin are polyethylenes, more preferably, HDPE and LLDPE, and even more preferably, HDPE. Typically, the even more preferred HDPE has a density from about 0.940 to about 0.970 g/cm$^3$.

Suitable unsaturated monomers are also well known. Preferred unsaturated monomers are ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and the like, and mixtures thereof. Maleic anhydride is particularly preferred. Other suitable unsaturated monomers are described in U.S. Pat. No. 6,385,777 and U.S. Patent Application Publication No. 2007/0054142, the teachings of which are incorporated herein by reference.

The relative amounts of polyolefin and unsaturated monomer used will vary and depend on factors such as the nature of the polyolefin and the unsaturated monomer, the desired tie-layer properties, the reaction conditions, the available equipment, and other factors. Usually, the unsaturated monomer is used in an amount within the range of about 0.1 to about 15 weight percent, based on the total weight of the grafted polyolefin, preferably from about 0.5 to about 6 weight percent, and most preferably from about 1 to about 3 weight percent.

Grafting of the unsaturated monomer (s) to the polyolefin is accomplished according to known procedures, generally by heating a mixture of the unsaturated monomer(s) and the polyolefin. Most typically, the grafted polyolefin is prepared by melt blending the polyolefin with the unsaturated monomer in a shear-imparting extruder/reactor. Twin screw extruders such as those marketed by Coperion under the designations ZSK-53, ZSK-83, ZSK-90 and ZSK-92 are especially useful for performing the grafting step. A free-radical initiator such as an organic peroxide can be employed but is not necessary.

Grafting of the unsaturated monomer to the polyolefin is performed at elevated temperatures, preferably within the range of 180 degrees Celsius to 400 degrees Celsius, more preferably from 200 degrees Celsius to 375 degrees Celsius, and most preferably from 230 degrees Celsius to 350 degrees Celsius. Shear rates in the extruder can vary over a wide range, preferably from 30 to 1000 rpm, more preferably from 100 to 600 rpm, and most preferably from 200 to 400 rpm. Preferably, the grafting reaction occurs under an inert gas, such as nitrogen.

Suitable olefin elastomers include ethylene-propylene rubber (EPR), ethylene-propylene-diene monomer rubber (EPDM), the like, and mixtures thereof. Preferably, the olefin elastomers contain from about 10 to about 80 weight percent of ethylene recurring units, based upon the total weight of the olefin elastomer. More preferred olefin elastomers contain from about 10 to about 70 weight percent of ethylene units.

Commercially available olefin elastomers include Lanxess Corporation's Buna™ EP T2070 (68 weight percent ethylene and 32 weight percent propylene, based on the total weight of the copolymer); Buna EP T2370 (3 weight percent ethylidene norbornene, 72 weight percent ethylene, and 25 weight percent propylene, based on the total weight of the copolymer); Buna EP T2460 (4 weight percent ethylidene norbornene, 62 weight percent ethylene, and 34 weight percent propylene, based on the total weight of the copolymer); ExxonMobil Chemical's Vistalon™ 707 (72 weight percent ethylene and 28 weight percent propylene, based on the total weight of the copolymer); Vistalon 722 (72 weight percent ethylene and 28 weight percent propylene, based on the total weight of the copolymer); and Vistalon 828 (60 weight percent ethylene and 40 weight percent propylene, based on the total weight of the copolymer).

Suitable ethylene-propylene elastomers also include Exxon Mobil Chemical's Vistamaxx™ elastomers, particularly grades 6100, 1100, and 3000, and Dow Chemical's Versify™ elastomers, particularly grades DP3200.01, DP3300.01, and DP3400.01, which have ethylene contents of 9 weight percent, 12 weight percent, and 15 weight percent, respectively, based upon the total weight of the copolymer.

Additional EPDM rubbers include Dow's Nordel™ hydrocarbon rubber, e.g., the 3722P, 4760P, and 4770R grades.

Suitable long-chain branched polyolefins include polyethylenes having long-chain branching. Preferably, the long-chain branched polyolefin is a low density polyethylene (LDPE). The LDPE can be an ethylene homopolymer or ethylene copolymerized with one or more monomers, such as vinyl acetate, methyl acrylate, acrylic acid, ethyl acrylate, or a C3 to C10 α-olefin.

The LDPE can have a density from about 0.900 g/cm$^3$ to about 0.930 g/cm$^3$, preferably from 0.910 g/cm$^3$ to about 0.9250 g/cm$^3$, and more preferably from 0.915 g/cm$^3$ to about 0.9200 g/cm$^3$. The LDPE can have a melt index, measured according to ASTM D 1238 at a load of 2.16 kg and a temperature of 190 degrees Celsius, ranging from about 0.10 g/10 min to about 25.0 g/10 min, preferably from about 0.1 g/10 min to about 10.0 g/10 min.

The LDPE is preferably prepared by free radical, high pressure polymerization, in particular by using a tubular or autoclave high pressure polymerization process in the presence of a free radical initiator.

In the preferred embodiment, the LDPE is preferably ethylene homopolymer with a density of about 0.918 g/cm3 and a melt index of about 0.25 g/10 min. Suitable LDPE polymers include the Petrothene™ series LDPE resins such as Petrothene™ NA940, which are products of Equistar Chemicals, LP.

As with selection of the relative amounts of the polyolefin and the unsaturated monomer for preparation of the grafted polyolefin previously described, the amount of olefin elastomer and the amount of the branched polyethylene used depends on the nature of the grafted polyolefin, the olefin elastomer, and the long-chain branched polyolefin, the desired tie-layer properties, the coupling conditions, equipment, and other factors. Generally, however, the amount of olefin elastomer used will be in an amount from about 0.2 to about 60 weight percent, based on the weight of the grafted polyolefin copolymer composition produced, preferably from about 0.8 to about 50 weight percent, more preferably from about 1 to about 35 weight percent, most preferably from about 1 to about 30 weight percent. Generally, the amount of the long-chain branched polyolefin used will be in an amount from about 1.5 to about 50 weight percent, based on the weight of the grafted polyolefin copolymer composition produced, preferably from about 2 to about 40 weight percent.

In the process for making the grafted polyolefin copolymer, the grafted polyolefin, the olefin elastomer, and the long-chain branched polyolefin are coupled, in the presence of free radicals. The coupling of the olefin elastomer to the grafted polyolefin may precede, occur simultaneously with, or follow the coupling of the long-chain branched polyolefin to the grafted polyolefin. These couplings can be performed using any suitable reactor. Preferably, the couplings occur under an inert gas, such as nitrogen.

Conveniently, the couplings are performed by combining freshly-prepared grafted polyolefin with the olefin elastomer and the long-chain branched polyolefin in a shear-imparting extruder/reactor as described earlier. In one particularly preferred approach, the grafted polyolefin is transferred while still molten from an outlet of a first extruder directly to a second extruder in which the couplings with the olefin elastomer and the long-chain branched polyolefin occur.

The grafted polyolefin, the olefin elastomer, and the long-chain branched polyolefin couple at elevated temperature, preferably at temperatures between 120 degrees Celsius to 300 degrees Celsius, more preferably from 135 degrees Celsius to 260 degrees Celsius. Preferably, the temperature for the coupling used to make this graft composition is lower than that used to make the grafted polyolefin. Shear rates in the extruder for this step can vary over a wide range, preferably from 30 to 1000 rpm, more preferably from 100 to 600 rpm, and most preferably from 200 to 500 rpm.

The resulting grafted polyolefin copolymer is conveniently quenched and pelletized at this point, but it can be combined immediately after preparation with the base resin composition as is described further below.

Suitable base resins include ethylene homopolymers; copolymers of ethylene with C3-C8 α-olefins, vinyl carboxylates and alkyl acrylates; terpolymers of ethylene and propylene with diene monomers; propylene homopolymers; polyisobutylene; and copolymers of isobutylene and isoprene. Ethylene homopolymers and copolymers can include MDPE; HDPE; LLDPE; very low density polyethylene; ultra low density polyethylene; ethylene-vinyl acetate (EVA) copolymers; ethylene-acrylate copolymers such as ethylene-ethyl acrylate copolymer and ethylene-n-butyl acrylate copolymers; and blends thereof.

Linear low density polyethylene (LLDPE) is a preferred base resin. In particular, the LLDPE is preferably a copolymer of ethylene and 1-butene, 1-hexene, or 1-octene. Preferably, the LLDPE is hexene-based and more preferably, having hexane extractables at room temperature from about 18 to about 20 weight percent. Preferably, the LLDPE has a density from about 0.895 to about 0.925 g/cm³ and a melt index from about 0.5 and about 5 g/10 min, more preferably from about 0.8 to about 2.5 g/10 min. Suitable LLDPE base resins include the Petrothene™ GA502, GA503, GA602, and GA616 series resins, which are products of Equistar Chemicals, LP.

The base resin is also discussed in U.S. Patent Application Publication No. 2012/0077048, which is hereby incorporated by reference in its entirety.

In a preferred aspect, the process for making the grafted polyolefin copolymer composition is integrated with a process for making the base resin. In this process, freshly-made base resin powder (e.g., LLDPE) is blended in line with the grafted polyolefin copolymer composition to generate a mixture that is useful as a masterbatch or as a tie-layer adhesive. The grafted polyolefin copolymer composition can be in the form of pellets or it can be combined with the base resin powder immediately after the grafted polyolefin copolymer composition is prepared. In either case, the "in-line" process affords products with reduced thermal history and, frequently, improved properties (see U.S. Pat. No. 7,064,163, the teachings of which are incorporated herein by reference).

The polyolefin-based composition can include other commonly used components. Suitable examples include adhesion promoters, elastomeric polymers, UV inhibitors, antioxidants, thermal stabilizers, and the like. For some examples of these, see U.S. Pat. No. 6,835,777, the teachings of which are incorporated herein by reference.

The adhesives are particularly useful for making multi-layer structures such as films and sheets, including barrier films. The multi-layer films have at least two layers in addition to the adhesive layer, which bonds the other layers together. Usually, at least one layer serves as a barrier layer.

Multi-layer films, typically made by coextrusion, frequently include a polyolefin layer such as LDPE, LLDPE, HDPE, EVA, ethylene-acrylic acid copolymers, ethylene-methacrylic acid copolymers, ethylene-acrylic acid ester copolymers, ethylene-methacrylic acid ester copolymers, ionomers, and the like. Barrier resins used are typically polar polymers such as ethylene-vinyl alcohol (EVOH) or polyamide resins such as nylon.

Tie-layer adhesives of the present disclosure can be used in numerous multi-layer barrier film constructions, including structures having five, seven, nine, or more layers. Illustrative multi-layer constructions include the following where "FCL" represents a food contact layer such as LDPE, LLDPE, EVA, ethylene-acrylic acid or ester copolymer, ethylene-methacrylic acid or ester copolymer, ionomers or the like:

HDPE/adhesive/EVOH/adhesive/HDPE
    HDPE/adhesive/polyamide/adhesive/HDPE
    EVOH/adhesive/HDPE/adhesive/EVOH
    LDPE/adhesive/polyamide/adhesive/FCL
    LDPE/adhesive/EVOH/adhesive/FCL
    LLDPE/adhesive/EVOH/adhesive/FCL
    LLDPE/adhesive/polyamide/adhesive/FCL
    HDPE/adhesive/EVOH/adhesive/FCL
    HDPE/adhesive/polyamide/adhesive/FCL
    HDPE/adhesive/polyamide/EVOH/polyamide/adhesive/FCL Some commonly used sealable film constructions include:
    LLDPE/adhesive/EVOH/adhesive/sealant
    HDPE/adhesive/polyamide/adhesive/sealant
    HDPE/adhesive/EVOH/adhesive/sealant
where the sealant layer is, for example, EVA, LLDPE or ionomer.

In another embodiment, the present disclosure provides a process for producing a polyolefin-based composition. The steps include: (a) reacting a polyolefin with an unsaturated monomer in a first extruder to make a grafted polyolefin; (b) transferring the grafting polyolefin to a second extruder; (c) in the presence of free radicals, coupling the grafted polyolefin with an olefin elastomer composition and a long-chain branched polyolefin in the second extruder; (d) quenching the free radicals of step (c) to form a grafted polyolefin copolymer composition; and (e) compounding the grafted polyolefin copolymer composition with a base resin composition. Optionally, the components of the compounding step may further include an additives composition.

In yet another embodiment, the present disclosure provides a process for producing a tie-layer adhesive. The steps include: (a) in the presence of free radicals, coupling a grafted polyolefin composition with an olefin elastomer composition; (b) in the presence of free radicals, coupling the grafted polyolefin composition with a long-chain branched polyolefin composition; (c) quenching the free radicals of steps (a) and (b) to form a grafted polyolefin copolymer composition; and (d) compounding the grafted polyolefin copolymer composition with a base resin composition. Optionally, the components of the compounding step may further include an additives composition.

EXAMPLES

The following non-limiting examples illustrate the invention.

For the comparative example and the examples of an embodiment of the present invention, a grafted polyolefin was prepared by feeding a fractional melt index, high density polyethylene (density: 0.957 g/cm³; High Load Melt Index: 3 g/10 min; Polydispersity Index: 10.2; $M_n$: 23,000; $M_w$: 235,000; $M_z$: 1.5*10⁶; and $M_{z+1}$: 3.9*10⁶) and maleic anhydride (2.2 weight percent, based on total charged reactants) to a COPERION™ ZSK-92 twin-screw extruder having zones heated at temperatures ranging from 88 degrees Celsius to 252 degrees Celsius and operated at shear rates within the range of 435 rpm and under nitrogen. The extruder had eleven heating zones, which were heated as followed: zone 1 (88 degrees Celsius); zones 2 and 3 (204 degrees Celsius); zones 4-6 (252 degrees Celsius); zones 7-9 (149 degrees Celsius); and zones 10 and 11 (93 degrees Celsius).

For the comparative example, a grafted copolymer of the grafted polyolefin and the olefin elastomer was prepared by feeding and reacting the grafted polyolefin and an ethylene-propylene rubber (EPR) into a COPERION™ ZSK-92 twin-screw extruder. The specific EPR employed was Vistalon™ 722, which is a product of ExxonMobil™ having 72 weight percent ethylene recurring units, based upon the total weight of the EPR, and a Melt Index of 1.0 g/10 min. The extruder was operated at a temperature of 93 degrees Celsius, a shear rate of 250 rpm, and under nitrogen. The resulting graft composition was then cooled and pelletized. The resulting grafted copolymer had a Melt Index of 4.5 g/10 min and a maleic anhydride content of 1.4 weight percent.

For the comparative example, a low density polyethylene was compounded with the grafted polyolefin. The specific long-chain branched polyolefin was PETROTHENE™ NA940000. NA940000 is an extrusion grade low density polyethylene (density: 0.918 g/cm³; Melt Index: 0.25 g/10 min), produced by a free radical, high pressure polymerization process.

For the examples of an embodiment of the present invention, a grafted polyolefin copolymer was prepared by feeding and coupling, in the presence of free radicals, (a) the grafted polyolefin, (b) an ethylene-propylene rubber (EPR), and (c) a long-chain branched polyolefin, into a COPERION™ ZSK-92 twin-screw extruder, to form. The specific EPR employed was Vistalon™ 722, and the specific long-chain branched polyolefin was PETROTHENE™ NA940000.

The extruder was operated at a temperature of 93 degrees Celsius, a shear rate of 250 rpm, and under nitrogen. The resulting graft composition was then cooled and pelletized. The resulting grafted copolymer had a Melt Index of 3.0 g/10 min and a maleic anhydride content of 1.2 weight percent.

For the comparative example and the examples of an embodiment of the present invention, the base resin was a linear low density polyethylene (LLDPE). The specific, linear low density polyethylene was PETROTHENE™ GA602050. GA602050 is a pelletized hexene-based copolymer linear low density polyethylene (density: 0.917 g/cm³; Melt Index: 2.0 g/10 min).

For the comparative examples and the examples of an embodiment of the present invention, the additives included IRGANOX™ 1076 and IRGAFOS™ 168. IRGANOX™ 1076 is a sterically-hindered phenolic antioxidant available from CIBA™. IRGAFOS™ 168 is a trisarylphosphite processing stabilizer also available from CIBA™.

For the comparative example, (a) the grafted copolymer of the grafted polyolefin and the olefin elastomer, (b) the low density polyethylene, (c) the linear low density polyethylene, and (d) the additives were dry blended and then melt extruded at 200-240 degrees Celsius and 210-250 rpm to form tie-layer adhesives.

For the examples of an embodiment of the present invention, (a) the grafted polyolefin copolymer, (b) the linear low density polyethylene, and (c) the additives were dry blended and then melt extruded at 200-240 degrees Celsius and 210-250 rpm to form tie-layer adhesives.

TABLE 1

| Component | C. Ex. 1 | Ex. 2 | Ex. 3 |
|---|---|---|---|
| Grafted Copolymer of the Grafted Polyolefin and the Olefin Elastomer | 21.5 | | |
| Long-Chain Branched Polyethylene (NA940000) | 5 | | |
| Grafted Polyolefin Copolymer | | 26.5 | 27.5 |
| LLDPE (GA602050) | 73.24 | 73.24 | 72.24 |
| Irganox ™ 1076 | 0.16 | 0.16 | 0.16 |
| Irgafos ™ 168 | 0.1 | 0.1 | 0.1 |
| Total | 100 | 100 | 100 |

More specifically, five-layer films (3 mils) were produced using the tie-layer adhesives of the comparative example (C. Ex. 1) and the inventive examples (Ex. 2 and Ex. 3). Each multi-layer film was made on a Killion extruder (comprised of 3 extruders in this case) with a barrel length to barrel diameter (L/D) ratio of 24:1, a barrel diameter of about 2.54 cm (1 inch) to about 3.18 cm (1.25 inches), and 3 barrel heating zones. Killion extruders may be obtained from Killion Extruders, Inc. of Cedar Grove, N.J.

| Extruder | | | |
|---|---|---|---|
| Extruder | Barrel Diameter | XL:D Ratio | Heating Zones |
| Extruder 1 | 3.18 cm (1.25 inches) | 24:1 | 3 |
| Extruders 2 & 3 | 2.54 cm (1 inch) | 24:1 | 3 |

Each multi-layer film has the structure: HDPE/tie layer/EVOH/tie layer/HDPE.

The HDPE is ALATHON™ M6210, a product of EQUISTAR™ Chemicals, LP, which has an Melt Index of 0.95 dg/min and density of 0.958 g/cm³. The ethylene-vinyl alcohol copolymer (EVOH) is SOARNOL™ DC3203 FB grade, product of Nippon Gohsei™ Kagaku K.K., Japan.

The layer distribution was 43 thickness percent, 4 thickness percent, 6 thickness percent, 4 thickness percent, and 43 thickness percent, respectively based on total film thickness.

TABLE 2

| Test | C. Ex. 1 | Ex. 2 | Ex. 3 |
|---|---|---|---|
| Percent NAS Clarity | 24.9 | 32.1 | 33 |
| Adhesion (1 Day) - kg/cm (lb/in) | 1.37 (1.58) | 1.48 (1.71) | 1.51 (1.74) |

TABLE 2-continued

| Test | C. Ex. 1 | Ex. 2 | Ex. 3 |
|---|---|---|---|
| Adhesion (4 Day) - kg/cm (lb/in) | 1.52 (1.75) | 1.69 (1.95) | 1.77 (2.04) |

What is claimed is:

1. A process for producing a composition comprising the steps of:
   a. reacting an unsaturated monomer with a polyolefin composition to produce at least one live, wherein the reacting step a. excludes an olefin elastomer;
   b. coupling the olefin elastomer to the at least one live, grafted polyolefin in the presence of an inert gas to form a first couplet;
   c. subsequently coupling a long-chain branched polyolefin to the first couplet in the presence of an inert gas to form a second couplet, wherein the grafted polyolefin of the first couplet comprises a live, grafted polyolefin during the coupling of the second couplet; wherein the second couplet comprises about 0.2% to about 60% by weight of the olefin elastomer and about 1.5% to about 50% by weight of the long-chain branched polyolefin.

2. The process of claim 1, further comprising compounding about 2% to about 50% by weight of the second couplet with about 50% to about 98% by weight of a base resin composition.

3. The process of claim 2, further comprising compounding the second couplet with a linear low density polyethylene (LLDPE) base resin composition from a reactor prior to extruding the LLDPE through an extruder.

4. The process of claim 2, further adding an additives composition having one or more additives.

5. The process of claim 4, wherein the additives composition comprises one or more of an antioxidant, a stabilizer, and combinations thereof.

6. The process of claim 1, wherein the live, grafted polyolefin is transferred as a molten material, without having been pelletized, from a first extruder to a subsequent extruder in which the couplings of the first couplet and second couplet occur.

* * * * *

UNITED STATES PATENT AND TRADEMARK OFFICE
CERTIFICATE OF CORRECTION

PATENT NO. : 10,240,072 B2
APPLICATION NO. : 14/056337
DATED : March 26, 2019
INVENTOR(S) : Botros It is certified that error appears in the above-identified patent and that said Letters Patent is hereby corrected as shown below:

In the Specification

In Column 1, Line 48, delete "styrenic" and insert -- Styrene --, therefor

In Column 8, Line 39, delete "0.918 g/cm3" and insert -- 0.918 g/cm$^3$ --, therefor In the Claims In Column 13, Claim 1, Line 13, after "one live," insert -- , grafted polyolefin, --

In Column 14, Claim 3, Line 9, after "claim 2," delete ", further"

Signed and Sealed this
Twenty-sixth Day of September, 2023

Katherine Kelly Vidal
*Director of the United States Patent and Trademark Office*